Figure 7:
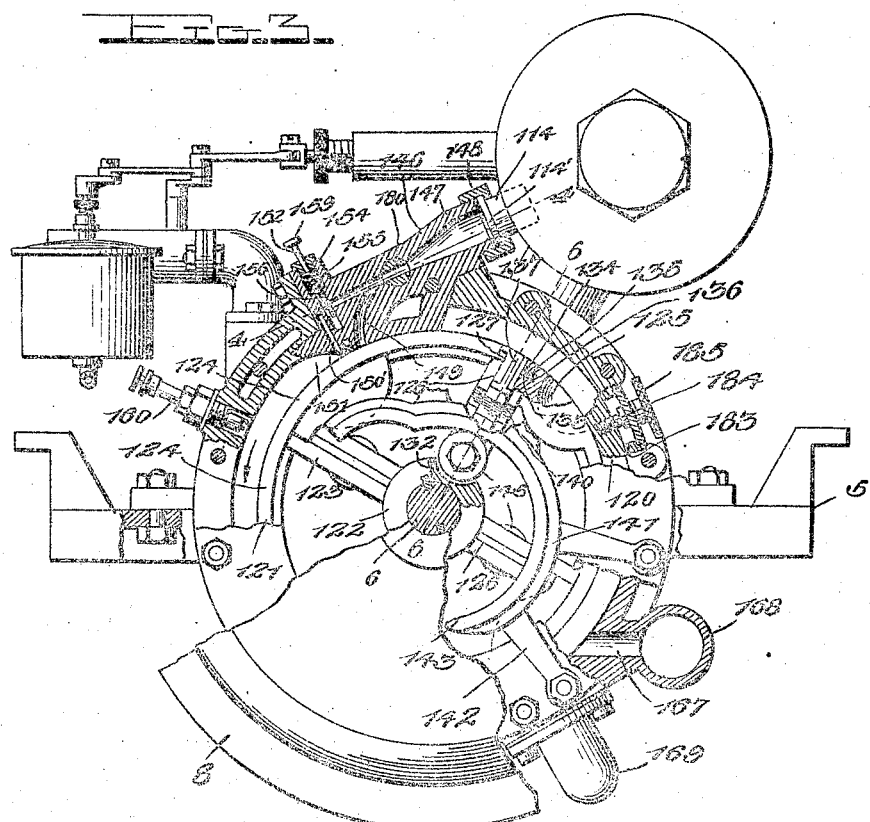

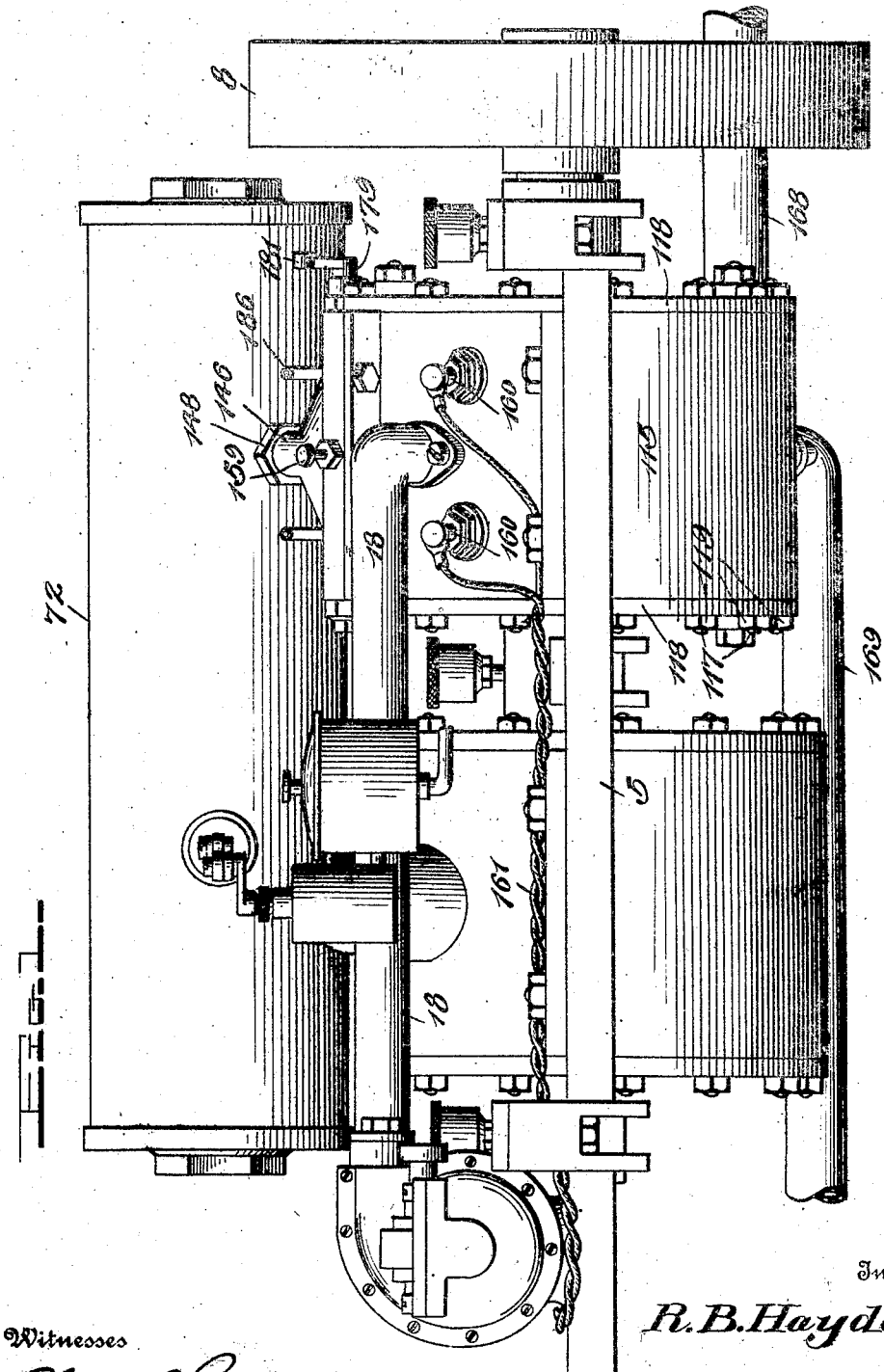

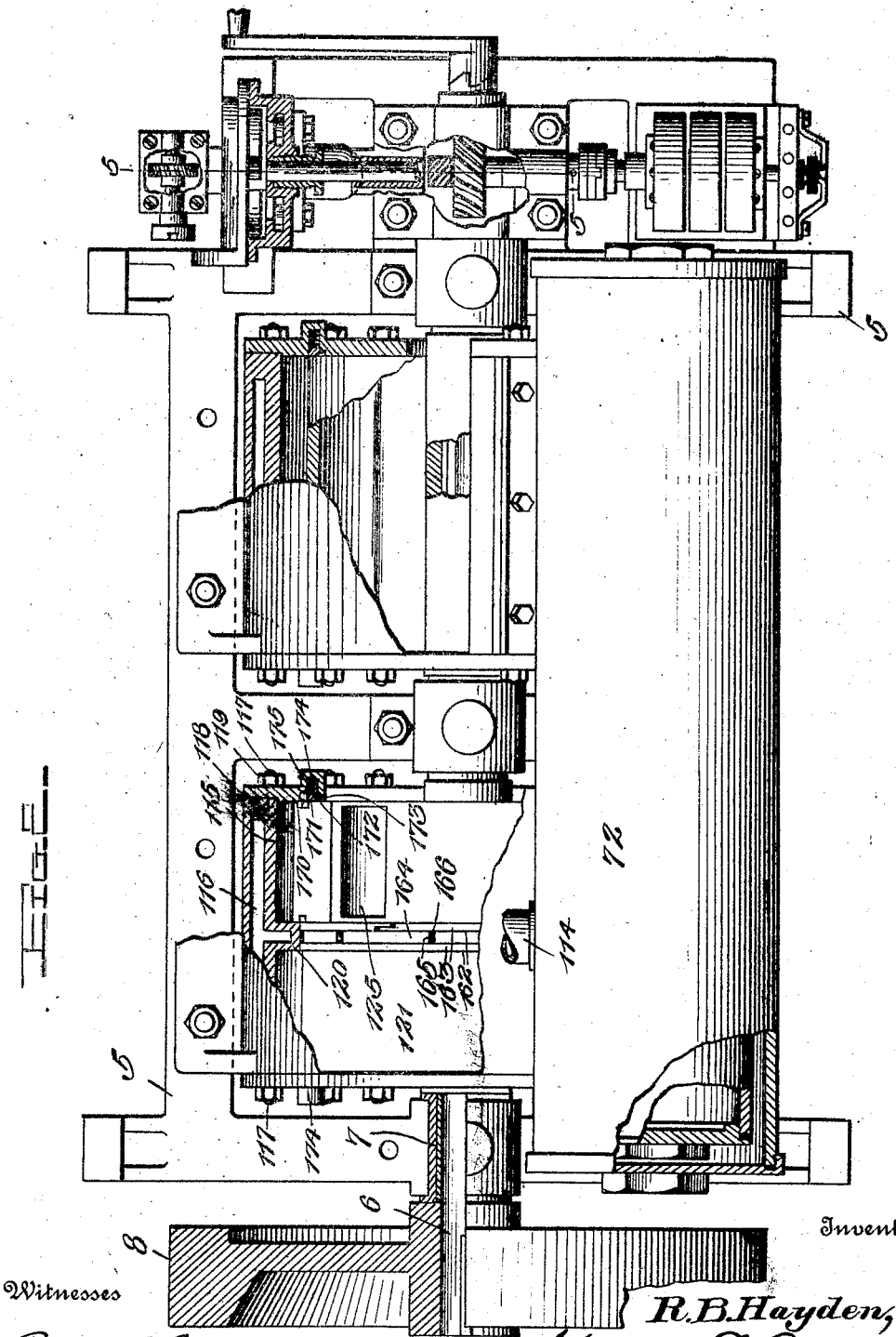

R. B. HAYDEN.
ROTARY ENGINE.
APPLICATION FILED OCT. 7, 1912.

1,105,076.

Patented July 28, 1914.
6 SHEETS—SHEET 3.

Witnesses
Chas. L. Griestauer
W. J. Hind

Inventor
R. B. Hayden,
By Watson E. Coleman
Attorney

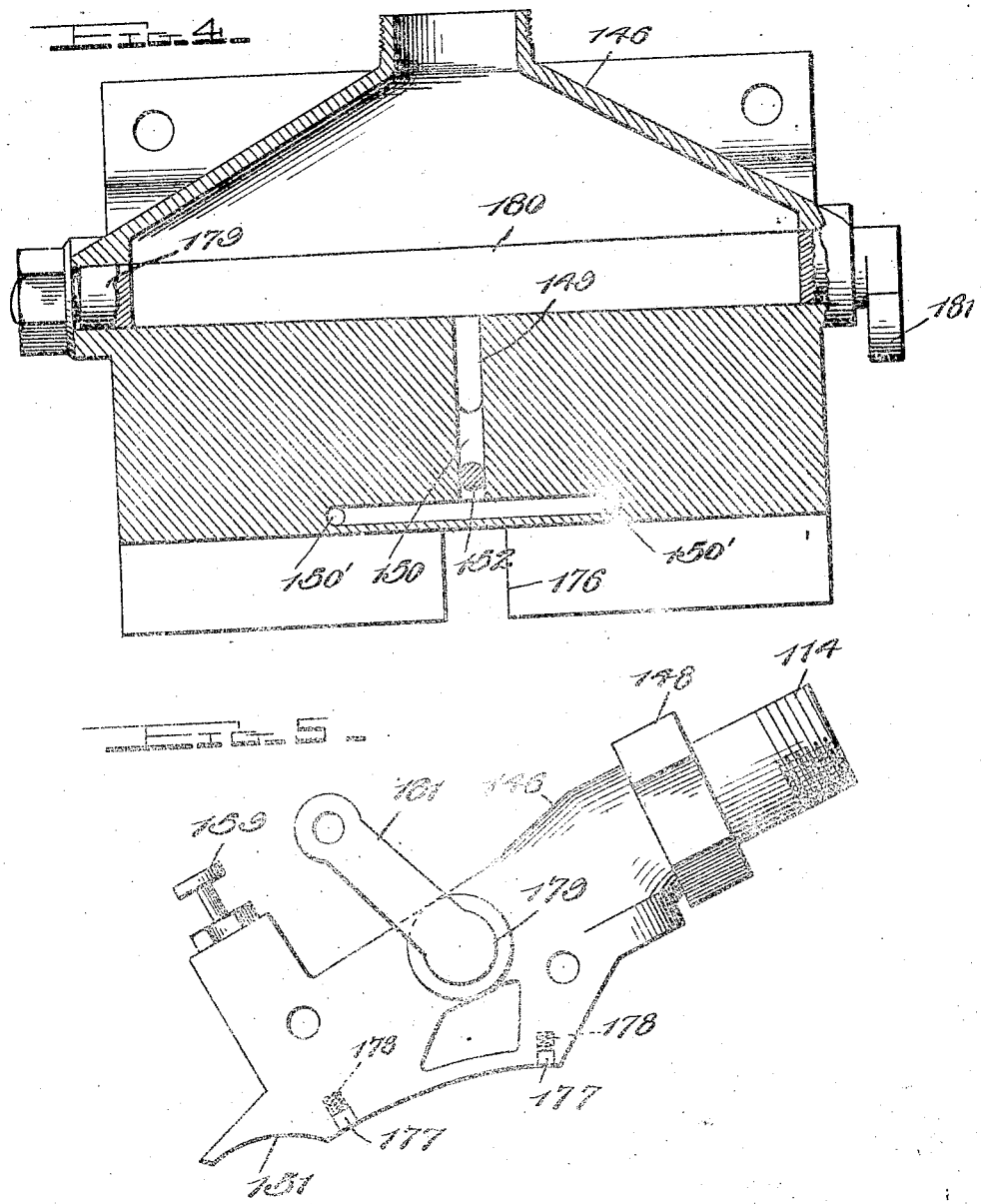

R. B. HAYDEN.
ROTARY ENGINE.
APPLICATION FILED OCT. 7, 1912.
1,105,076.
Patented July 28, 1914.
6 SHEETS—SHEET 5.
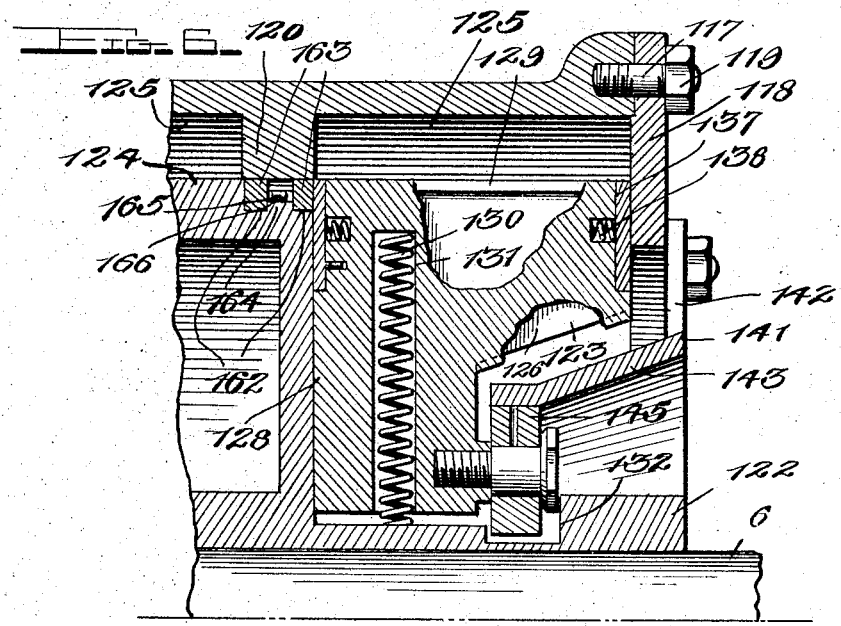
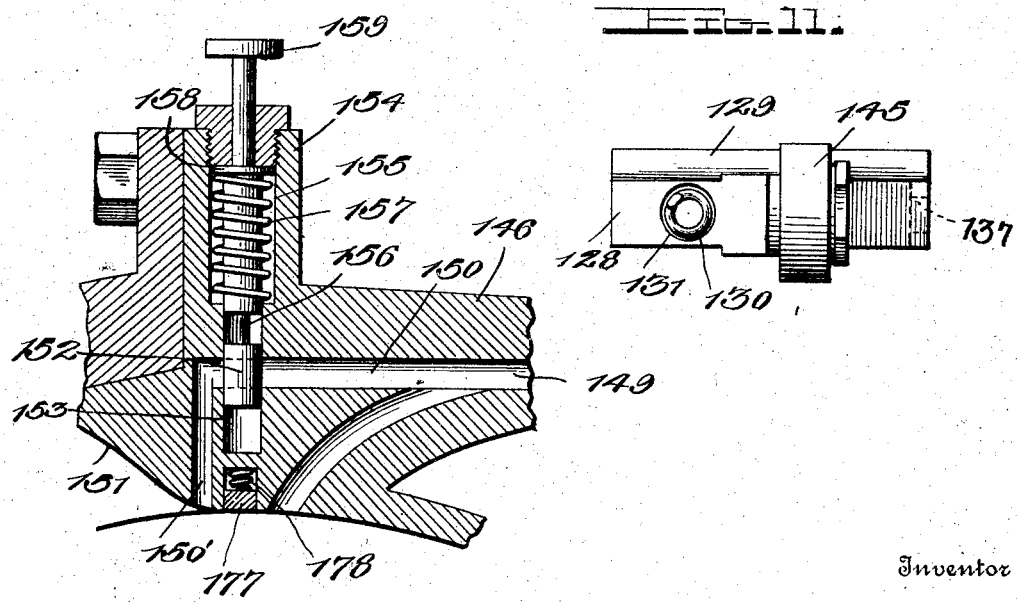
Witnesses
Chas. L. Griesbauer.
A. J. Hind.
Inventor
R. B. Hayden,
By Watson E. Coleman.
Attorney

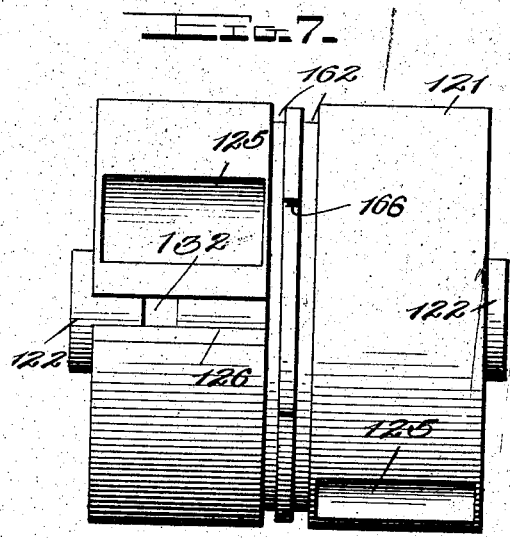
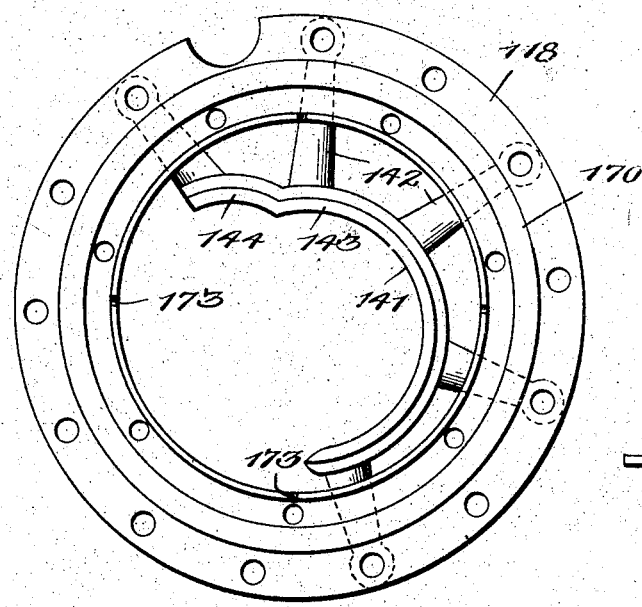
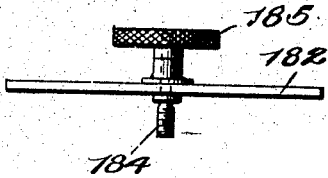

UNITED STATES PATENT OFFICE.

ROBERT B. HAYDEN, OF SPOKANE, WASHINGTON.

ROTARY ENGINE.

1,105,076.

Specification of Letters Patent.

Patented July 28, 1914.

Application filed October 7, 1912. Serial No. 724,368.

*To all whom it may concern:*

Be it known that I, ROBERT B. HAYDEN, a citizen of the United States, residing at Spokane, in the county of Spokane and State of Washington, have invented certain new and useful Improvements in Rotary Engines, of which the following is a specification, reference being had to the accompanying drawings.

This invention relates to rotary engines and more particularly to an engine of that type wherein a rotor provided with a plurality of radially movable blades is employed, said blades being acted upon by the driving medium to drive said rotor and transmit power to the main shaft upon which said rotor is mounted.

The primary object of the invention is to provide in an engine of the above type, means whereby frictional resistance is reduced to a minimum thus insuring a high degree of efficiency in the operation of the engine and obtaining a maximum of working energy from a minimum consumption of the gas, steam or other impelling fluid.

Another object of the invention is to provide a rotary engine particularly designed for use upon motor vehicles and improved starting means for the engine whereby the objectionable cranking of the same to effect the initial operation of the engine is eliminated.

A more specific object of the invention resides in the provision of a rotor provided with a plurality of radially movable blades, and means carried by said blades coacting with a cam surface to move said blades out of contact with the wheel of the engine cylinder through substantially one half of the rotation of the rotor, whereby frictional resistance to such rotation is minimized.

Still another object of the invention is to generally improve internal combustion engines of the rotary type and to provide a comparatively simple and compact arrangement of the various parts whereby the vibration is reduced to a minimum and an extremely durable structure produced, which result in the development of a high degree of efficiency in the operation of an engine of this character.

With the above and other objects in view as will become apparent as the description proceeds, the invention consists in certain constructions, combinations and arrangements of the parts that I shall hereinafter fully describe and claim.

For a full understanding of the invention reference is to be had to the following description and accompanying drawings, in which—

Figure 8:
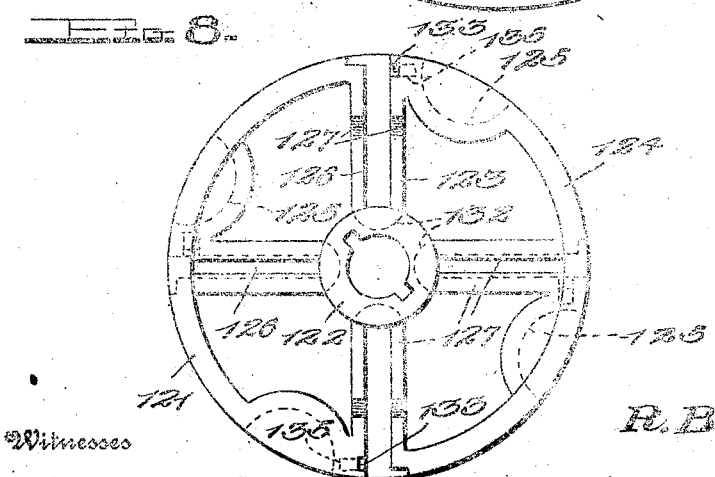

Figure 1 is a side elevation of an engine embodying the present invention; Fig. 2 is a top plan view partly in section; Fig. 3 is an end elevation, certain parts being broken away and others shown in section to more clearly illustrate the construction and arrangement of the elements; Fig. 4 is a section taken on the line 4—4 of Fig. 3; Fig. 5 is an end elevation of the intake head removed from the engine cylinder; Fig. 6 is a longitudinal section taken on the line 6—6 of Fig. 3 to illustrate the mounting of the propelling blades in the rotor; Fig. 7 is a side elevation of the rotor, the blades being removed therefrom; Fig. 8 is an end elevation of the rotor; Fig. 9 is an enlarged detail section of a fragment of the intake head, showing the mounting of the foot valve; Fig. 10 is an end elevation of one of the heads of the rotor cylinder and the cam track; Fig. 11 is an end elevation of one of the movable rotor blades and Fig. 12 is a detail side elevation of the removable plate mounted in the wall of the engine cylinder.

Corresponding and like parts are referred to in the following description and designated in the accompanying drawings by like reference characters.

Referring in detail to the drawings 5 designates a base or bed of any suitable form which is preferably mounted and secured upon a foundation of masonry or other construction in the usual manner. Upon this bed frame the various parts of the engine structure to be hereinafter referred to are supported.

The power shaft 6 is mounted in suitable bearings 7 secured upon the bed frame 5 and upon one end of this shaft the fly wheel 8 is keyed.

The engine proper includes the cylinder 115, said cylinder consisting of the cylindrical body provided in its wall with a water chamber 116. The ends of the body of the cylinder are provided with stud bolts 117 which are adapted to project through openings provided in the annular end plates 118, suitable nuts 119 being threaded upon said bolts to rigidly secure the plates against the body of the cylinder. The body of the cylinder is centrally provided with an inwardly projecting annular rib 120 said rib being of substantially U shaped form to provide a water receiving channel which is in communication with the chamber 116 of the body of the cylinder. This annular rib divides the interior of the cylinder into two chambers in each of which a rotor section 121 is located. As these sections are identical in construction, the detail description of one will suffice for both. The hub 122 of the rotor is keyed or splined upon the power shaft 6 and is connected by means of the radially disposed arms 123 with the annular body wall 124 of the rotor. This annular body wall is provided adjacent to each of the radial arms with a longitudinally extending pocket 125. These pockets are preferably of semi-cylindrical shape in cross section, though it will be understood that they can be rectangular or of any other desired cross sectional form. The arms 123 of the rotor are longitudinally slotted as shown at 126 in a similar manner to the arms of the compressor drum. These arms are increased in width and extended longitudinally of the rotor at their outer ends as shown at 127.

In the slots 126 of the arms of the rotor the blades 128 are mounted and are adapted for longitudinal movement. The outer ends of these blades which are of similar form to the outer ends of the rotor arms extend the entire length of the rotor section and are provided with the flanges 129 for engagement with the inner wall of the cylinder body. The blades 128 are normally forced outwardly and held in engagement with the cylinder wall by means of the coil springs 130 arranged in the cylindrical bores 131 of said blades and engaging at their inner ends in sockets provided in the hub of the rotor. The rotor hub is also provided at diametrically opposite points with cavities 132. In one of the walls of the slots or guide ways 126 of the rotor arms, grooves 133 extending longitudinally of the rotor are provided to receive the packing strips 134. Recesses 135 are also provided in the annular wall of the rotor in which coil springs 136 are arranged to bear against the packing strips 134 and force the same into engagement with the radially movable arms. Packing strips 137 are also arranged in grooves provided in the end edges of the arms and are adapted to be forced outwardly by means of the coil springs 138, into engagement with the annular plate 118 and the rib 120 respectively, of the cylinder. These strips are provided with the flanges 140 at their inner ends to prevent their radial movement upon the blades.

It will be observed from reference to Fig. 3 that the annular wall of the rotor is disposed in spaced concentric relation to the wall of the engine cylinder and the blades 128 are normally engaged with the cylinder wall at their outer ends. In order to reduce the frictional resistance to a minimum, I provide means for moving the blades inwardly and holding the same out of contact with the cylinder wall through substantially one half of the revolution of the rotor. This means embodies a spider 141 which is preferably formed integrally with the end plate 118 of the cylinder. This spider includes the arms 142 and a track 143 integrally formed upon the inner ends of said arms. This track is eccentrically disposed with relation to the power shaft 6 and at one end is provided with a cam portion 144, the purpose of which will be more clearly understood as the description proceeds. Upon the inner ends of the radially movable blades 128, the rollers 145 are rotatably mounted. These rollers are adapted to engage the inner edge of the eccentrically disposed track 143, whereby the blades 128 will be gradually forced inwardly in the rotation of the rotor, said rollers being received in the cavities 132 of the hub of the rotor.

The body of the cylinder is longitudinally cut away to receive a head block generally indicated by the numeral 146 which is rigidly bolted or otherwise secured to the spaced edges of the cylinder body. This head block is provided with a tubular exteriorly threaded extension 147 to receive a coupling or union 148 whereby said head block is connected to the supply pipe 114 of the tank 72, said pipe being provided with a flange 114' for engagement by the coupling member. The head block 146 is also provided with a main passage 149 extending longitudinally therethrough and having its inner end curved and opening upon the inner end of said head block with which the periphery of the annular body wall of the rotor is adapted to closely engage. This head block is also provided with a bypass 150 which is provided with branches 150' which open at their lower ends upon the curved end face 151 of the head block 146, to supply the gaseous mixture directly to each of the cylinder chambers, immediately in advance of the point of contact between the inner surface of the head block at one end and the rotor. It will be observed that the curve of the face 151 of the block is quite gradual so as to permit of a comparatively slow outward movement of the blades of the rotor under pressure of the springs 130 into contact with the cylinder wall. Communication is only obtained between the by-pass 150 and the interior of the cylinder when the engine is started, the gaseous mixture being supplied in the normal operation of the engine to the pockets 125. The supply of combustible fluid may be admitted directly to the cylinder through the medium of a valve 152 longitudinally movable in a cylindrical bore 153 extending at right angles to the by-pass 150 and opening at one end into a chamber 155 provided in a cylindrical extension 154 formed upon the head block 146. The valve member 152 is provided intermediate of its ends with a diametrically reduced portion 156 forming an annular chamber between said reduced portion and the wall of the bore 153. A spring 157 is arranged upon the valve stem in the chamber 155 and bears against the lower end wall of the chamber and against a flange 158 formed upon the valve stem. The outer end of the valve stem is provided with a suitable foot plate 159 whereby the valve may be forced inwardly against the tension of the spring 157 to dispose the reduced portion 156 thereof in line with the by-pass 150, thus permitting the flow of the gaseous mixture from the main passage 149 directly into the engine cylinder at the end of the head block. Adjacent to the curved end face 151 of the head block, the spark plugs 160 are mounted in the cylinder wall, one of the spark plugs being provided for each chamber of the cylinder formed by the rib 120. The spark plugs are supplied with electric current from the magneto or suitable batteries through the wires 161.

The rotor sections arranged in the chambers of the cylinder are integrally connected, said connecting portion being provided with annular grooves 162 to receive the packing rings 163. The annular flange 164 between the grooves 162 is of slightly less diameter than the rotor and is held out of contact with the peripheral face of the rib 120 on the cylinder wall by means of the packing rings which frictionally engage said rib. These rings carry studs 165 to be received in the recesses or notches 166 in the edge of the flange 164. The blades 128 in one of the rotor sections are disposed intermediate of the plane of the blades on the other rotor section longitudinally of the engine cylinder, so that said blades on the respective cylinders are alternately subjected to the impact of the exploded gases, whereby a high speed is maintained in the operation of the engine, and a maximum of working efficiency secured.

After the charge has been exploded and the expansive pressure thereof against the rotor blades has practically entirely expended its force in the rotation of the rotor, the burned gas is exhausted through the ports 167 into an exhaust pipe 168 which may be integrally cast upon the cylinder wall or secured thereto in any preferred manner. A pipe 169 is also connected to the engine cylinder and receives the hot water from the chamber 116 thereof to return the same to the radiator where it is again cooled and returned through the pipe 18 to said cylinder chamber.

In order to prevent the escape of the burned gases around the ends of the rotor, the end plates 118 of the cylinder are provided with annular grooves 170 to receive the packing rings 171 which are of similar construction to the packing rings 105 in the ends of the compressor cylinder, said packing rings 171 having studs 172 to engage in the recesses 173, in the inner wall of the groove 170. The end plates 118 are also provided with tubular bosses 174 in which the coil springs 175 are arranged to bear against the packing rings and force the same into close frictional contact with the ends of the rotor.

The head block 146 is provided with a groove or recess 176 to receive the annular rib 120 of the engine cylinder. The head block is also provided with packing strips 177 which are forced into frictional contact with the periphery of the rotor by means of the springs 178. The supply of compressed gas to the cylinder of the engine may be controlled by the operator through the medium of a throttle valve 179, said valve being in the form of a cylindrical rod which is mounted to rotate in the head block and is provided with a slot 180 to register with the main passage 149. This valve rod is provided upon one end with a crank arm 181 to which a rod is adapted to be connected, said rod extending to a control lever arranged adjacent to the operator's seat, when the engine is used for the propulsion of vehicles.

By providing the radially movable blades and means for maintaining the same out of contact with the cylinder wall through a part of the rotation of the rotor, the accumulation of carbon upon the movable blades is practically eliminated, the carbon accumulating in the pockets 125 of the rotor from which it may be readily removed. For this purpose I provide a plate 182 which is adapted to be arranged in a longitudinal opening 183 provided in the body wall of the engine cylinder and is securely held in position by means of the threaded bolt 184 which is adapted to be received in a threaded recess or socket provided in the annular rib 120 formed on the cylinder wall. The outer end of this bolt is provided with a suitable hand wheel 185 whereby the same may be conveniently turned.

To each chamber of the engine cylinder in which the rotor blades are arranged, the oil supply pipes 186 are connected. These pipes supply lubricating oil to the various movable parts of engine, and as this supply of oil is constant during the operation of the engine, it will be seen that friction is greatly minimized, thus conducing to the smooth running of the engine and enhancing the durability of the movable elements. It is of course understood that suitable oil cups are provided for the bearings of the main power shaft 6 and such other accessories as are commonly known in the art will also of course be adopted in the practical embodiment of the invention.

In starting the operation of the engine the throttle valve is first opened. The operator now presses downwardly upon the foot valve 152, thus permitting the compressed gas to enter directly into the engine cylinder. The foot valve is then released and the electric current supplied to the spark plugs by closing a switch in the battery circuit. It is essential that the foot valve be released before the charge is ignited in order that liability of the occurrence of an explosion in the compression tank shall be eliminated. The closure of the foot valve before the ignition of the charge closes the bypass 150 in the head block, thereby cutting off the communication between the compression tank and the explosion chamber in the engine cylinder. This gas entering the cylinder will fill the space between the curved end face 151 of the head block and the end of the plate 128 which is disposed adjacent to said curved face and upon the opposite side of the spark plug 160. The gas being ignited by the spark expands and acts against the face of the blade 128, the pressure of the gas against the blade being sufficiently powerful to rotate the rotor through one half of a complete revolution. By arranging the rotor blades in one of the cylinder chambers, in planes intermediate of the planes of the blades in the other of said chambers, one of the blades will be in position at the start of the operation of the engine to receive the impact of the exploded gas. After the engine has been thus started the operator releases pressure upon the stem of the valve 152 so that the gas will be supplied from the tank 72 by a pipe 114 through the passage 149 to the pockets 125 in the periphery of the rotor. These pockets as they pass the mouth of the passage 149 receive a charge of gas and carry the same to the explosion chamber which is bounded by the curved end face 151 of the head block, the face of the rotor blade and the periphery of the rotor. As soon as the end of the blade passes beyond the spark plug in each chamber of the cylinder, the explosion takes place, and thus previous to the ignition of the charge, the periphery of the rotor between the pockets therein closes the lower end of the passage 149, the packing strips 177 affording practically an air tight contact of the head block with the rotor and thus eliminating the liability of the flame reaching the passage 149 and exploding the gas in the same and in the pressure supply tank 72. When the blade which is subjected to the impact of the exploded charge has completed about one half of the possible extent of its movement due to the expansion of the gas, or in other words when said blade has described an arc of substantially ninety degrees or one quarter of a complete revolution of the rotor, one of the rotor blades in the other chamber of the cylinder is in position to receive the impact of the gas charge which is exploded in said chamber. Thus the operation of the engine may be maintained at a constant high speed, and fluctuations in the working energy of the engine avoided. The expansion of the exploded gas continues until it reaches the exhaust port 167, at which time its pressure is little greater than that of the atmosphere. The cam portion 144 of the track 143 and the face 151 of the head block 146 are of such curvature as to cause the outer ends of the blades 128 to contact with the curved face of the block as they move past the same. This contact between the blades and the block tends to prevent the accumulation of carbon deposited upon the face of the block. The blades will also prevent the escape of gas from the pockets 125 of the rotor past the end of the blade, owing to the fact that said blades are forced by the springs 130 into close engagement with the curved face 151 of the head block 146.

It is to be understood that the invention is not limited in its practical operation to the use of combustible gas as a driving medium, as steam and other expansive fluids may also be utilized. It will further be obvious that the engine cylinder may be provided with any desired number of the rotor chambers and corresponding number of series of blades employed in connection therewith. The number of the blades in each series may be also increased as desired, and the head blocks having the intake ports multiplied in accordance with the size of the engine and the power which it is necessary to derive from the same. The invention is also susceptible of a great many minor modifications in the form, proportion and arrangement of the various elements employed without departing from the essential features involved therein or sacrificing any of the advantages accruing to the invention.

Having thus described the invention, what is claimed is:

1. In a rotary engine, a cylinder provided with an exhaust port, fluid supply means for the cylinder, a rotor concentrically mounted in the cylinder, a plurality of spring pressed radially movable blades arranged in the rotor and normally held in frictional engagement with the wall of the cylinder, an eccentrically disposed stationary track, and means carried by the blades to coöperate with the track in the rotation of the rotor and move the blades inwardly out of frictional engagement with the cylinder wall during a portion of each revolution of the rotor.

2. In a rotary engine, a cylinder having an exhaust port, fluid supply means for the cylinder, a rotor concentrically mounted in said cylinder, spiders secured to the ends of the cylinder, each of said spiders having an eccentrically disposed track surface, and rollers mounted on the blades to coöperate with said eccentric track surface in the rotation of the rotor whereby the blades are moved inwardly out of contact with the cylinder wall during a portion of each revolution of the rotor.

3. In a rotary engine, a cylinder having a central annular rib dividing the cylinder into two chambers, integrally connected rotor sections concentrically mounted in said chambers and spaced from the cylinder wall, a plurality of movable spring pressed blades arranged in each of the rotor sections and normally held in frictional engagement with the wall of the cylinder, the blades in one rotor section being disposed in planes intermediate of the blades in the other rotor section longitudinally of the cylinder, fluid supply means for the cylinder chambers, each of said chambers having an exhaust port, and means to move said blades inwardly and hold the same out of frictional engagement with the cylinder wall during a portion of each revolution of the rotor.

4. In a rotary engine a cylinder having an exhaust port, a head block mounted in the cylinder wall and extending into the same, one end of the head block being curved and merging into the wall of the cylinder, said head block having a main intake port, a by-pass communicating at one end with said port and opening at its other end upon the curved end face of the block, a valve in said by-pass, a rotor concentrically mounted in the cylinder and frictionally engaging the inner face of the head block to normally close the main intake port, a plurality of radially movable blades mounted in the rotor and normally held in engagement with the cylinder wall, the periphery of the rotor being provided with gas receiving pockets adjacent to the blades adapted to receive a charge of gas from the main intake port, igniting means arranged in the cylinder wall adjacent the curved end of the head block, and means for moving said blades inwardly to permit the same to pass beyond the head block, the ends of said blades moving upon the curved end face of the block and preventing the escape of gas from the pockets between the blades and the cylinder wall, said blades successively forming one wall of the explosion chamber to receive the impact of the exploded charge.

5. In a rotary engine, a cylinder having an exhaust port, a head block mounted in the cylinder wall and extending into the cylinder, said block being provided with a main intake port, said head block having a curved end face and a by-pass communicating with the main port and opening upon said curved end face, a foot valve mounted in the head block and normally closing communication between the by-pass and the interior of the cylinder, a rotor concentrically mounted in the cylinder and frictionally engaging the head block to close the main intake port, said rotor being provided in its periphery with a plurality of pockets, a plurality of radially movable blades mounted in the rotor, a spring normally forcing said blades outwardly into frictional engagement with the cylinder wall, igniting means arranged in the cylinder wall adjacent to the curved end face of the head block, a stationary eccentric track having a cam portion, and rollers mounted upon the blades to coact with the eccentric track whereby the blades are moved inwardly and held out of contact with the cylinder wall during a portion of each revolution of the rotor, said eccentric portion of the track permitting of the outward movement of the blades as they successively pass beyond the intake port of the head block to engage the same with the curved end face of the block and prevent the escape of the gas from the rotor pockets, said blades forming one wall of the explosion chamber to receive the impact of the ignited charge.

6. In a rotary engine, a cylinder provided with a central annular rib dividing the same into two chambers, a rotor concentrically mounted in said cylinder, said rotor having two series of radially movable blades normally engaging the cylinder wall at their outer ends, said cylinder having exhaust ports communicating with the chambers, a head block common to both chambers of the cylinder mounted in the wall of said cylinder and projecting into the same, the periphery of the rotor frictionally engaging the inner face of the head block, said head block having a supply port opening into the chambers of the cylinder and a by-pass communicating with said port and provided with branch passages opening upon one end of the head block, said rotor normally closing the main supply port, igniting means for each chamber of the cylinder arranged adjacent to the head block, and stationary means coacting with the means carried by the movable blades to move the same inwardly out of contact with the cylinder wall through a portion of each revolution of the rotor and permit the same to pass said head block, said rotor being provided in its periphery with pockets to receive the charge from the main supply port of the head block, the outer ends of said blades forming one wall of the explosion chamber to receive the impact of the exploded charge.

7. In a rotary engine, a cylinder provided with an exhaust port, a rotor concentrically mounted in said cylinder, a head block fixed in the cylinder wall, and projecting into said cylinder, said block having frictional engagement upon the periphery of the rotor, pressure fluid supply means connected to the head block, said block having a main intake port opening upon the inner face of the block which is engaged with the rotor, said block being further provided with a curved end face and a by-pass communicating with the main intake port and opening upon said end face of the block, a throttle valve mounted in the head block to open and close communication between the cylinder and the source of supply through said main intake port, a spring held valve member mounted in the block and normally closing said supply to the cylinder through the by-pass, a plurality of radially movable blades mounted in the rotor normally held in frictional contact with the cylinder wall, means to move said blades inwardly out of contact with the cylinder wall to permit the same to pass the head block, said means admitting of the outward movement of said blades into sliding contact with the curved end face of the head block as the blades are projected outwardly into engagement with the wall of the cylinder, said rotor being provided in its periphery with pockets to receive the propelling fluid from the main supply pipe, the opening of said spring held valve in the head block permitting of the passage of the fluid into the cylinder between the end of the head block and one of the rotor blades whereby the initial starting impulse is obtained.

8. In a rotary engine, a cylinder provided with an exhaust port, means for supplying fluid under pressure to the cylinder, a rotor concentrically mounted in the cylinder, a plurality of radially movable blades mounted in the rotor, springs normally acting to force said blades outwardly into frictional contact with the cylinder wall, said rotor having a hub provided in its periphery with spaced cavities, rollers mounted upon the inner ends of the blades, and an eccentric track within which said rollers are adapted to coöperate in the rotation of the rotor to move the blades inwardly out of contact with the cylinder wall during substantially one half of each revolution of the rotor, said rollers being received in the cavities of the rotor hub at the limit of the inward movement of the blades.

9. In a rotary engine, a cylinder having an exhaust port, fluid supply means for the cylinder, a rotor concentrically mounted in the cylinder, a plurality of radially movable spring pressed blades mounted in the rotor and normally held in frictional engagement with the cylinder wall, said blades being provided with offset portions on their outer ends extending substantially the entire length of the rotor, plates secured to the ends of the body wall of the cylinder, spiders integrally formed on said plates including eccentric track portions and cam portions at the ends of said eccentric track portions, and rollers mounted upon the inner ends of said blades for engagement with said tracks whereby the blades are forced inwardly out of contact with the cylinder wall during substantially one half of each revolution of the rotor, the movement of said rollers against the cam portions of the track permitting of the gradual outward movement of the roller blades into contact with the wall of the cylinder.

10. In a rotary engine, a cylinder provided with an exhaust port, fluid supply means for the cylinder, said cylinder having a central annular rib dividing the same into two chambers, a rotor centrally provided with spaced annular grooves, packing strips arranged in said grooves and engaging the annular rib on the cylinder wall, two series of radially movable blades mounted in the rotor, springs normally acting to project said blades outwardly into the cylinder chambers and into frictional contact with the cylinder wall, said rotor being provided in its periphery adjacent to each of the blades with a pocket extending substantially the entire length of the rotor chamber, means for moving said blades inwardly out of contact with the cylinder wall during a portion of each revolution of the rotor, end plates secured to the annular body wall of the cylinder, spring pressed packing strips arranged in the face of said end plates to engage the ends of the rotor, spring pressed packing strips arranged in the rotor engaging said movable blades, and spring pressed packing strips arranged upon the ends of each blade to engage the end plates of the cylinder and the central rib thereof, said packing strips affording a fluid tight barrier between the interior of the rotor and the space between said rotor and the cylinder wall.

In testimony whereof I hereunto affix my signature in the presence of two witnesses.

ROBERT B. HAYDEN.

Witnesses:
L. L. WESTFALL,
E. L. WESTFALL.